United States Patent
Gretz

(10) Patent No.: US 11,088,521 B1
(45) Date of Patent: Aug. 10, 2021

(54) REVERSIBLE LEVELING RING FOR SECURING VARIOUS COVER PLATES TO CONCRETE CANS

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 66 days.

(21) Appl. No.: 16/447,039

(22) Filed: Jun. 20, 2019

Related U.S. Application Data

(60) Provisional application No. 62/692,803, filed on Jul. 1, 2018.

(51) Int. Cl.
*H02G 3/14* (2006.01)
*H02G 3/18* (2006.01)

(52) U.S. Cl.
CPC ............... *H02G 3/14* (2013.01); *H02G 3/185* (2013.01)

(58) Field of Classification Search
CPC ................................ H02G 3/14; H02G 3/185
See application file for complete search history.

(56) References Cited

U.S. PATENT DOCUMENTS

| | | | |
|---|---|---|---|
| 5,272,278 A | 12/1993 | Wuertz | |
| 5,466,886 A | 11/1995 | Lengyel et al. | |
| 5,783,774 A | 7/1998 | Bowman et al. | |
| 6,179,634 B1 | 1/2001 | Hull et al. | |
| 7,795,544 B2 * | 9/2010 | Peck | H02G 3/185 174/482 |
| 8,273,998 B2 | 9/2012 | Drane | |
| 8,759,676 B1 | 6/2014 | Gretz | |
| 8,921,712 B1 * | 12/2014 | Gretz | H02G 3/14 174/487 |
| 9,667,049 B1 * | 5/2017 | Gretz | H02G 3/12 |
| 10,283,951 B1 | 5/2019 | Gretz | |
| 2008/0264665 A1 * | 10/2008 | Jolly | H02G 3/185 174/50 |
| 2009/0038842 A1 * | 2/2009 | Peck | H02G 3/185 174/482 |
| 2017/0256927 A1 * | 9/2017 | Padilla | G06K 7/10336 |

* cited by examiner

Primary Examiner — Pete T Lee

(57) ABSTRACT

A reversible leveling ring for an electrical floor box. Multiple bolt-hole patterns to enable the leveling ring to accommodate more than a single style of floor box cover. The leveling ring includes a ring body having an inner periphery and a plurality of arms extending from the inner periphery. A first set of arms includes bores extending from a first side of the ring and a second set of arms includes bores extending from a second side of the ring. The bores in the first set of arms match a circular bolt-hole pattern that is of a different diameter than the bolt-hole pattern in the second set of arms thereby enabling an installer to flip the leveling ring in order to accommodate cover plates having two bolt-hole patterns.

17 Claims, 4 Drawing Sheets

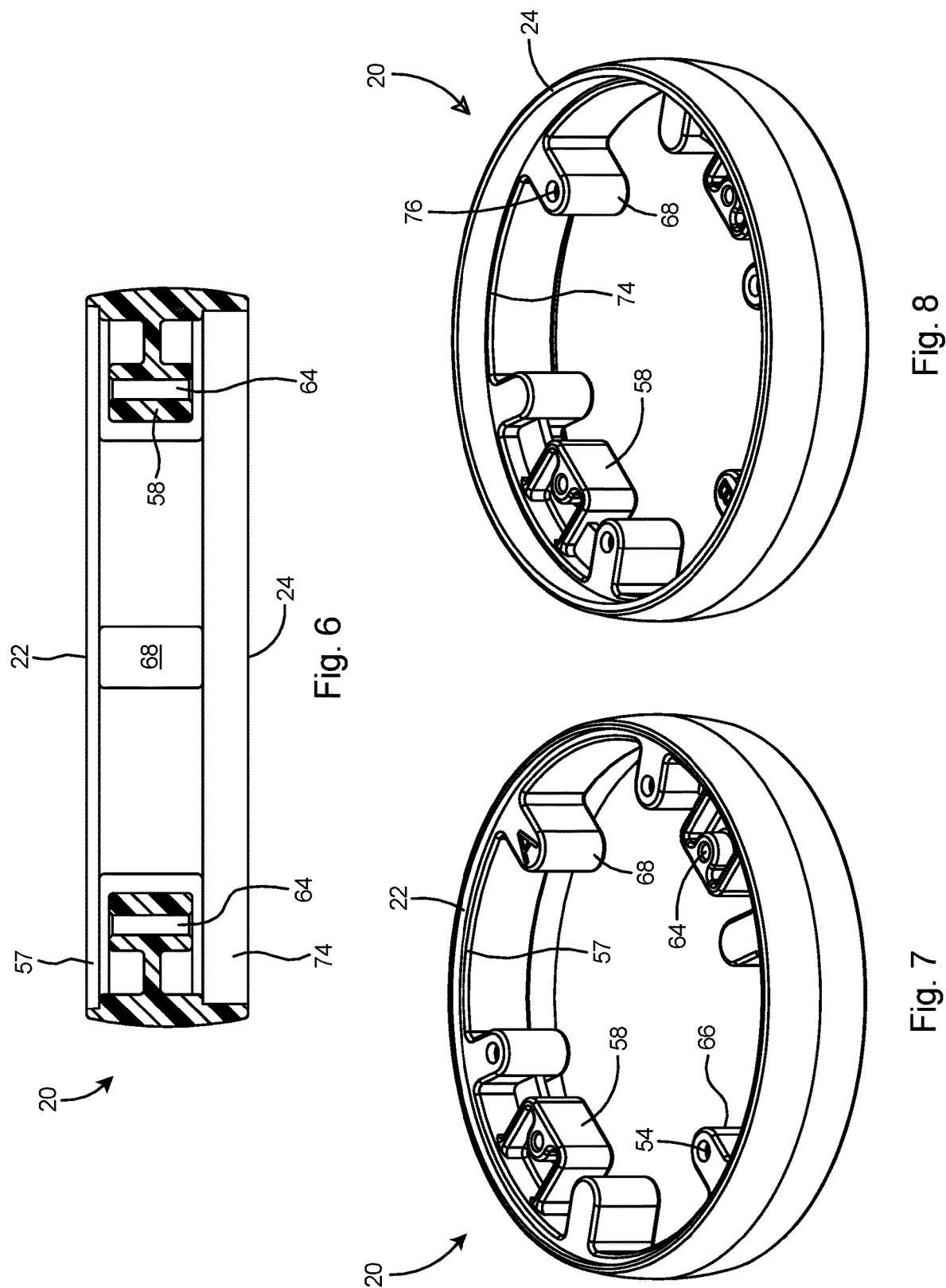

REVERSIBLE LEVELING RING FOR SECURING VARIOUS COVER PLATES TO CONCRETE CANS

CROSS-REFERENCE TO RELATED APPLICATIONS

This application claims the benefit of provisional U.S. Application No. 62/692,803, filed Jul. 1, 2018, the contents of which are incorporated herein in their entirety.

FIELD OF THE INVENTION

This invention relates to electrical boxes and specifically to a leveling ring for leveling an electrical device with respect to a floor surface.

BACKGROUND OF THE INVENTION

Electrical concrete cans, sometimes termed "electrical floor boxes", are used to form an electrical enclosure within a concrete pour area. Conventional leveling rings are commonly used for mounting an electrical component and a cover to the electrical concrete can.

Unfortunately, conventional leveling rings are limited to mounting covers of a single bolt-hole pattern. This creates an inconvenience to the installer as the leveling ring at the job site may not match the cover to be attached to the concrete can. Manufacturers typically provide electrical concrete can covers having a single bolt-hole pattern, which limits the leveling ring to the mounting of a single style of cover.

Accordingly, as there are a myriad of covers available from various manufacturers, it would be beneficial to provide a leveling ring for a concrete can or floor box that accommodates the mounting of covers with more than a single bolt-hole pattern. Providing a leveling ring with multiple mounting patterns enables the reduction of inventory as a single leveling ring can be used to mount multiple box covers and further provides flexibility to the installer at the job site.

BRIEF SUMMARY OF THE INVENTION

The invention is a reversible leveling ring with multiple bolt-hole patterns to accommodate more than a single style of floor box cover. The leveling ring includes a ring body having an inner periphery with a plurality of arms extending from the inner periphery. A first set of arms includes bores extending from a first side of the ring and a second set of arms includes bores extending from a second side of the ring. The bores in the first set of arms match a circular bolt-hole pattern that is of a different diameter than the bolt-hole pattern in the second set of arms thereby enabling an installer to flip the leveling ring in order to accommodate cover plates having two bolt hole-patterns.

OBJECTS AND ADVANTAGES

It is accordingly an object of the invention to provide a leveling ring that will accommodate cover plates having different bolt-hole patterns.

Another object is to simplify the installation of a cover onto a concrete box or floor box.

A further object of the invention is to reduce the number of separate stock keeping units of leveling rings required to be held in inventory for the installation of floor boxes.

These and other objects of the invention will be obvious in view of the following description and with reference to the accompanying drawings.

BRIEF DESCRIPTION OF THE SEVERAL VIEWS OF THE DRAWING(S)

Reference is made herein to the accompanying drawings, which are not necessarily drawn to scale, and wherein:

FIG. 6 is a sectional view of the leveling ring taken along line 6-6 of FIG. 2.

FIG. 7 is an isometric view of the leveling ring from the first side.

FIG. 8 is an isometric view of the leveling ring from the second side.

DETAILED DESCRIPTION

Figure 1:
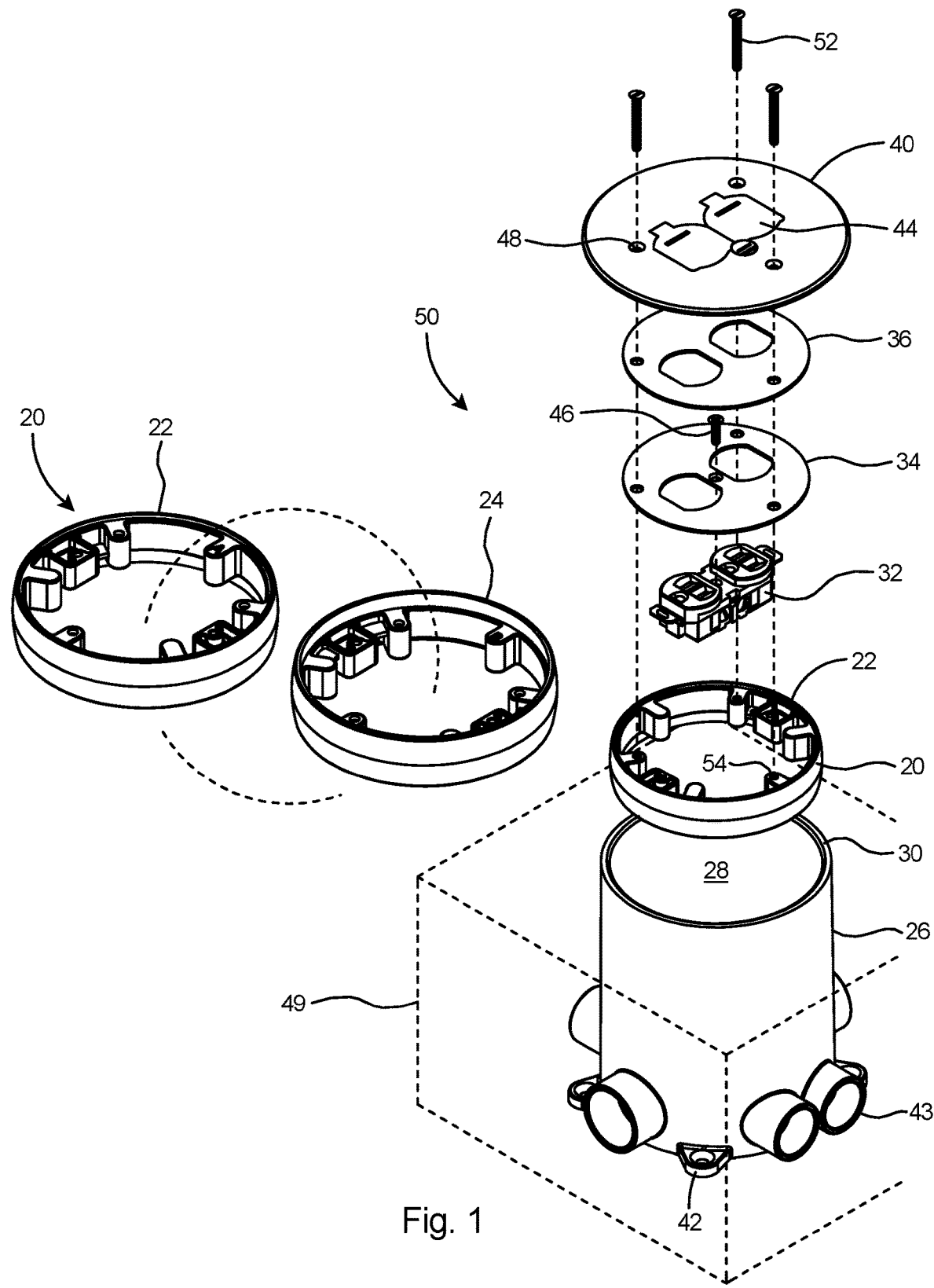
FIG. 1 is an exploded isometric view of a leveling ring according to the invention in alignment for assembly into an electrical floor box according to the invention.

With reference to FIG. 1, the present invention is a leveling ring 20 with multiple mounting patterns. The dashed lines on the left side of the figure illustrate that the leveling ring can be flipped from a first side 22 to a second side 24 in order to accommodate the mounting of covers having different bolt-hole patterns. The right side of the figure illustrates the assembly of an electrical concrete can 26 including the leveling ring 20 of the current invention. The leveling ring 20 is typically secured within the cavity 28 formed by the sidewall 30 of the concrete can 26. The concrete can assembly includes an electrical component 32, mounting plate 34, an optional gasket 36, and a cover plate or cover 40. The electrical component 32 depicted in FIG. 1 is a duplex electrical receptacle, although other electrical components such as switches, lights, etc. may be mounted within the concrete can. Concrete can 26 includes mounting ears 42 through which fasteners (not shown) may be driven for securing the can to a base. Conduit hubs 43 provide a structure for securing conduit (not shown) to the can and a pathway for leading wiring into the cavity 28.

The mounting plate 34 mates with the top of the electrical component 32, seats within an inner periphery of the leveling ring 20, and provides a level surface surrounding the electrical component 32. The gasket 36 is constructed of a resilient, compressible material and provides a weather-tight seal between the cover 40 and the mounting plate 34 and all the components that are mounted within the cavity 28 of the concrete can. The cover 40 depicted in FIG. 1 is a while-in-use cover with flip lids 44 which enable the closing or opening of one or both sides of the cover to enable connection of one or two electrical cords (not shown) to the duplex receptacle. The mounting plate 34 is secured to the duplex receptacle 32 by a screw 46. Cover 40 includes a plurality of bolt holes 48 creating a bolt-hole pattern.

As shown in the left side portion of FIG. 1, the leveling ring 20 can be flipped to accommodate a cover having a different bolt-hole pattern. After the concrete can is anchored to the ground by fasteners, rebar or similar devices, concrete 49 is poured and when cured, secures the concrete can 26 in place. The leveling ring 20 is flipped to the correct side to match the bolt-hole pattern of the cover 40. The duplex receptacle 32 is secured to the leveling ring 20 and the leveling ring is then secured to the sidewall 30 within the cavity 28 with adhesive, fasteners, or similar fastening means. Wiring connections (not shown) are then made to the duplex receptacle 32. The concrete can assembly 50 is then completed by driving one or more fasteners 52 through bolt holes 48 in the cover 40, gasket 36, and mounting plate 34 and into bores 54 in the leveling ring 20.

Figure 3:
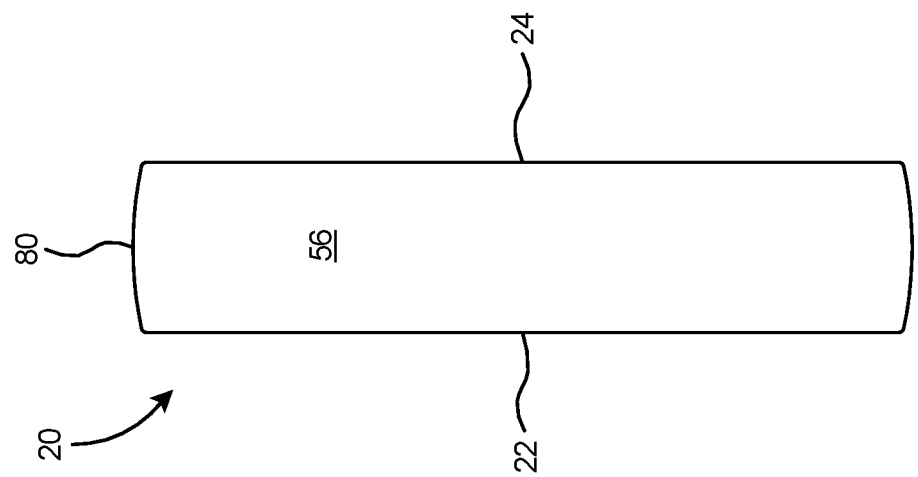
FIG. 3 is a side view of the leveling ring.
Figure 2:
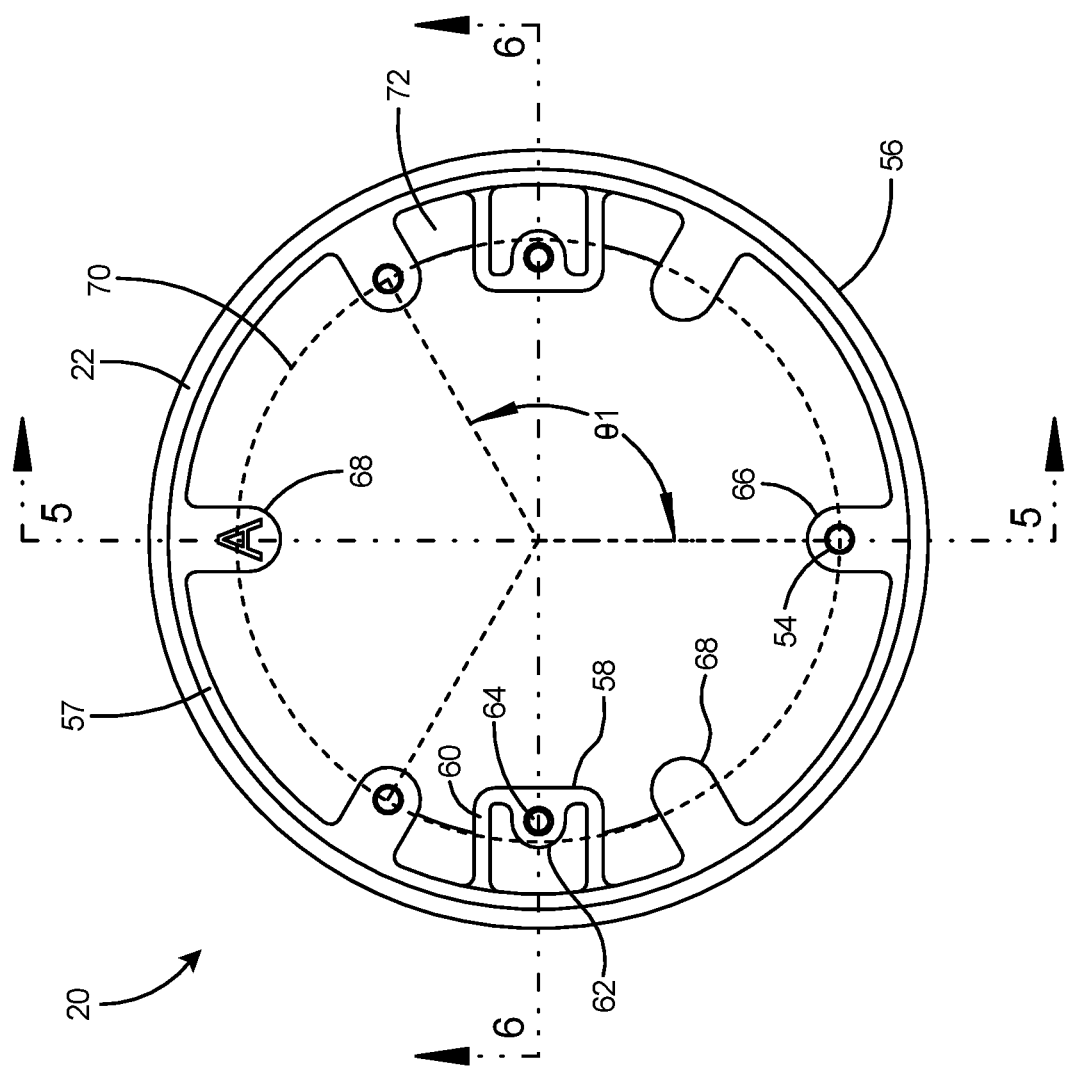
FIG. 2 is a plan view of the leveling ring from a first side.

Referring to FIGS. 2 and 3, the leveling ring 20 includes a ring body 56 with a recessed peripheral surface 57. Extending inward from the recessed peripheral surface 57 of the ring body 56 are two mounting posts 58. The mounting posts 58 each include a peripheral wall 60 supporting a component boss 62. A bore 64 extends through the component boss 62. The leveling ring further includes a plurality of arms extending inward of the ring body 56, including short arms 66 and long arms 68. The short arms 66 include the bores 54 that are accessible from the first side 22 of the leveling ring. The bores 54 include a circular bolt-hole pattern that will match the bolt-hole pattern of a cover member (not shown). Preferably the bores 54 are located on a circular pattern 70 of 3.5-inch diameter. The short arms 66 are at an angle of θ1 with respect to one another. Most preferably the short arms 66 are at an angle of 120 degrees with respect to one another. A brace 72 extends inward from the recessed peripheral surface 57 and between the short arm 66 and long arm 68 that are situated on either side of the mounting posts 58. Preferably, the recessed peripheral surface 57 is planar and parallel with respect to the first side 22 of the ring.

Figure 4:
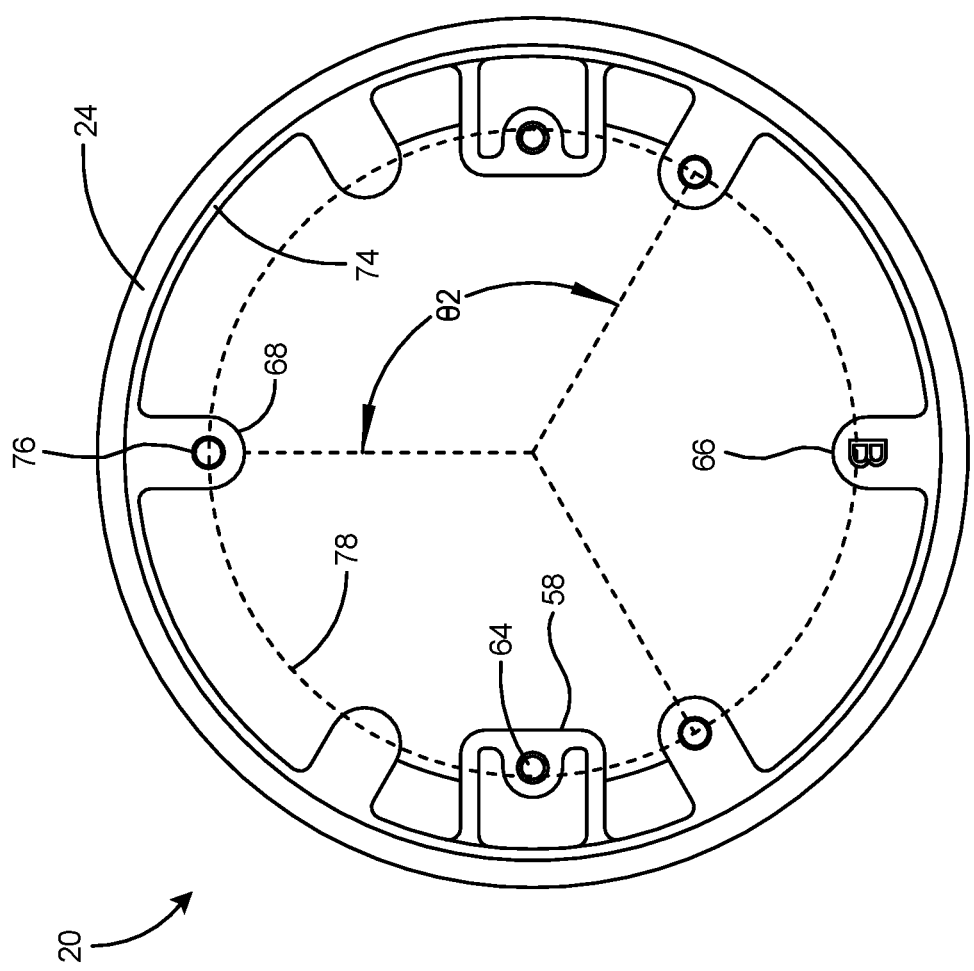
FIG. 4 is a plan view of the leveling ring from a second side.

With reference to FIG. 4, the second side 24 of the leveling ring 20 includes a recessed peripheral surface 74 and a bore 76 in each of the long arms 68, which bores 76 are accessible from the second side 24 of the leveling ring. The bores 76 include a circular bolt-hole pattern that will match the bolt-hole pattern of a cover member (not shown). Preferably the bores 76 are located on a circular pattern 78 of 3.375-inch diameter. The long arms 68 are at an angle of θ2 with respect to one another. Most preferably the long arms 68 are at an angle of 120 degrees with respect to one another. Preferably, the recessed peripheral surface 74 is planar and parallel with respect to the second side 24 of the ring.

Figure 5:
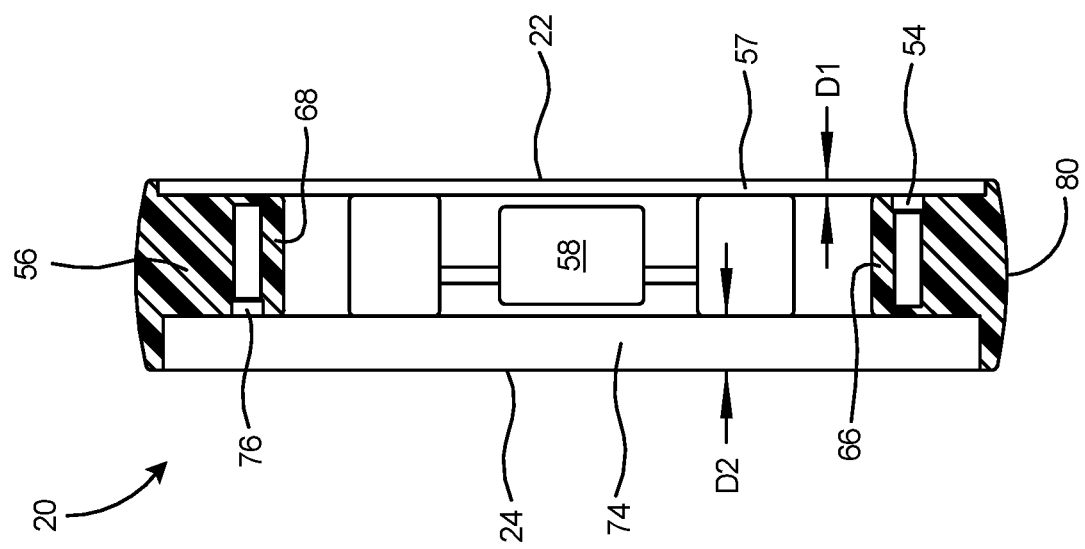
FIG. 5 is a sectional view of the leveling ring taken along line 5-5 of FIG. 2.

As shown in FIG. 5, the recessed peripheral surface 57 on the first side 22 of the leveling ring 20 is a shallow recess D1 from the first side 22 of the ring body 56. Conversely, the recessed peripheral surface 74 on the second side 24 of the leveling ring 20 is a deep recess D2 from the second side 24 of the ring body 56. Each side of the leveling ring accommodates a cover of a specific bolt-hole pattern. In order to help an installer determine which side of the leveling ring matches a cover with a specific bolt-hole pattern, each side of the ring is marked with indicia. As shown in FIG. 2 for example, the first side 22 of the leveling ring is marked with the letter "A" and, as shown in FIG. 4, the second side 24 of the ring is marked with the letter "B". The outer edge 80 of the ring body 56 is arcuate from the first side 22 to the second side 24 as shown. Thus bores 54 in short arms 66 are accessible from the first side 22 of the leveling ring and bores 76 in long arms 68 are accessible from the second side 24 of the leveling ring 20. A preferred embodiment of the leveling ring 20 would include an outer diameter of 4.43 to 4.53 inches to fit within a concrete can with a nominal outer diameter of about 6 inches and the leveling ring would accommodate a cover having a bolt-hole pattern of 3.5 inches diameter and, by flipping the leveling ring over to mount it within the concrete can in the opposite direction, would accommodate a cover having a bolt-hole pattern of 3.375 inches diameter. However, it is within the scope of the invention to produce the leveling ring in other diameters to accommodate other bolt-hole patterns.

The leveling ring 20 is preferably installed in the concrete can 26 by gluing it to the walls defining the cavity 28 of the concrete can (see FIG. 1). In a particularly preferred embodiment, the leveling ring 20 and concrete can are each molded in one-piece of polyvinyl chloride and the adhesive for gluing the leveling ring to the concrete can is PVC cement.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A reversible leveling ring for securing a cover to an electrical floor box comprising:
    an annular leveling ring including a ring body having a first side, a second side, an inner periphery, and a plurality of arms extending from the inner periphery, said arms including bores having an open end;
    the arms including a first set of arms and a second set of arms;
    the bores extend partially through said first set of arms and said bores include an open end on the first side of said ring body; and
    the bores extend partially through said second set of arms and include an open end on the second side of said ring body.

2. The reversible leveling ring of claim 1 comprising said bores in said first set of arms describe a circular bolt-hole pattern at a first distance from the center of said ring body.

3. The reversible leveling ring of claim 2 comprising said bores in said second set of arms describe a circular bolt-hole pattern at a second distance from the center of said ring body.

4. The reversible leveling ring of claim 3 comprising:
    said arms in said first set of arms extending from said inner periphery of said ring body at an angle with respect to one another; and
    said arms in said second set of arms extending from said inner periphery of said ring body at an angle with respect to one another.

5. The reversible leveling ring of claim 1 comprising: said angle of said first set of arms with respect to one another is 120 degrees; and said angle of said second set of arms with respect to one another is 120 degrees.

6. The reversible leveling ring of claim 1 comprising a shallow recess on said first side of said ring body.

7. The reversible leveling ring of claim 1 comprising a deep recess on said second side of said ring body.

8. The reversible leveling ring of claim 1 comprising a mounting post extending from said inner periphery of said ring body.

9. The reversible leveling ring of claim 8 comprising:
    a bore extending through both sides of said mounting post.

10. The reversible leveling ring of claim 4 comprising said bores in said first set of arms are located on a circular pattern of a first diameter.

11. The reversible leveling ring of claim 4 comprising said bores in said second set of arms are located on a circular pattern of a second diameter.

12. The reversible leveling ring of claim 8 comprising a peripheral wall on said mounting post.

13. The reversible leveling ring of claim 1 comprising:
a recessed peripheral surface on the first side of said ring body;
a recessed peripheral surface on the second side of said ring body; and
the recessed peripheral surfaces on said ring body are planar and parallel with respect to the sides of the ring body.

14. The reversible leveling ring of claim 3 comprising:
said ring body including an outer edge; and
the outer edge of the ring body is arcuate from the first side to the second side.

15. The reversible leveling ring of claim 8 comprising:
a brace extending around the inner periphery of the leveling ring between the first arm and second arm on either side of the mounting post, said brace integral with the first arm and second arm.

16. A reversible leveling ring for securing a cover to an electrical floor box comprising:
an annular leveling ring including a ring body having a first side, a second side, an inner periphery, and a plurality of arms extending from the inner periphery, said arms including bores therein;
the arms including a first set of arms and a second set of arms;
the bores in said first set of arms extending partially through said first set of arms and open to the first side of said ring body;
the bores in said second set of arms extending partially through said second set of arms and open to the second side of said ring body;
said bores in said first set of arms describing a circular bolt-hole pattern of a first diameter; and
said bores in said second set of arms describing a circular bolt-hole of a second diameter.

17. The reversible leveling ring of claim 16 comprising: a mounting post extending from said inner periphery of said ring body; a bore extending through both sides of said mounting post and a brace extending along the inner periphery of the leveling ring between the first arm and second arm.

* * * * *